March 31, 1970     G. S. EVANS     3,504,215
PLANAR FLUORESCENT LAMP WITH INTEGRAL AMALGAM TYPE
MERCURY-VAPOR PRESSURE CONTROL COMPONENT
Filed Nov. 30, 1967     3 Sheets-Sheet 1

WITNESSES

INVENTOR
George S. Evans.
BY
AGENT

March 31, 1970  G. S. EVANS  3,504,215
PLANAR FLUORESCENT LAMP WITH INTEGRAL AMALGAM TYPE
MERCURY-VAPOR PRESSURE CONTROL COMPONENT
Filed Nov. 30, 1967  3 Sheets-Sheet 2

United States Patent Office 3,504,215
Patented Mar. 31, 1970

3,504,215
PLANAR FLUORESCENT LAMP WITH INTEGRAL AMALGAM TYPE MERCURY-VAPOR PRESSURE CONTROL COMPONENT
George S. Evans, Caldwell, N.J., assignor to Westinghouse Electric Corporation, Pittsburgh, Pa., a corporation of Pennsylvania
Filed Nov. 30, 1967, Ser. No. 686,916
Int. Cl. H01j 1/62
U.S. Cl. 313—109
5 Claims

ABSTRACT OF THE DISCLOSURE

The mercury-vapor pressure in a planar fluorescent lamp is controlled by an amalgam that is retained at a pre-determined location within the lamp by a holder that is spaced from the light-emitting face of the envelope and does not detract from its uniformly lighted appearance. The holder is made from stiff material which can also be foraminous, such as wire mesh, and is attached to the envelope wall or to an interior part of the lamp structure (viz., the stem or one of the lead-in wires of an electrode mount assembly) that is anchored to the envelope.

BACKGROUND OF THE INVENTION

This invention relates to electric discharge lamps and has particular reference to an improved panel fluorescent lamp.

Panel fluorescent lamps are well known in the art and are becoming increasingly attractive from a commercial standpoint insofar as they are compact and provide an area source of light rather than a thin linear light source as in the case of conventional tubular lamps. The light is generated within a predescribed area by means of a planar envelope that has partitions which define a sinuous or labyrinthine discharge channel. The arc is confined to this channel and excites the phosphor coating on the inner surfaces of the envelope so that the front face of the envelope is intensely and uniformly lighted when the lamp is energized. The envelope can be contoured and constructed to provide a discharge path that is undulating, sinuous or of spiral configuration as disclosed in U.S. Patents Nos. 2,491,847; 2,987,640 and 3,047,763.

It has been the prior art practice to dose such panel fluorescent lamps with an amount of mercury in excess of that required to sustain the discharge and, as in the case of conventional tubular fluorescent lamps, to permit the mercury vapor pressure to be controlled by the temperature of the condensed pool of excess mercury. However, because of their compactness and the fact that they are operated at high power loadings in order to achieve an economic light output and high brightness levels, panel lamps have a higher operating temperature than standard tubular fluorescent lamps. As a result, the mercury vapor pressure is inherently too high for optimum efficiency.

SUMMARY OF THE INVENTION

It is accordingly the general object of the present invention to provide an improved panel fluorescent lamp.

Another and more specific object is the provision of a panel fluorescent lamp having a mercury-vapor pressure regulating component that can be readily and economically built into the lamp and does not obscure its light-emitting face or otherwise mar its lighted appearance or detract from its performance.

The aforesaid objects and other advantages are achieved in accordance with the present invention by utilizing an amalgam that is strategically located in such a position within the lamp envelope that it maintains the operating mercury-vapor pressure within the limits required for optimum efficiency. An amalgamating metal such as indium, tin, gold, thallium or alloys thereof is suspended in the discharge channel at a location remote from the faceplate of the envelope by a rigid holder that is attached directly to the envelope wall or to a vitreous stem or lead wire that constitutes part of an electrode mount assembly. The amalgam and holder are thus functionally and structurally designed and located so that the amalgam regulates the mercury vapor pressure during operation and improves the lamp efficiency without casting any shadows on the lighted face of the lamp or otherwise detracting from its lighted appearance.

BRIEF DESCRIPTION OF THE DRAWING

A better understanding of the invention will be obtained by referring to the accompanying drawing, wherein.

DESCRIPTION OF THE PREFERRED EMBODIMENTS

While the present invention can be used with advantage in various types of discharge devices that have planar envelopes and require a regulated mercury vapor pressure during operation for optimum efficiency, it is especially adapted for use in conjunction with panel type fluorescent lamps and has accordingly been so illustrated and will be so described.

Figure 1:
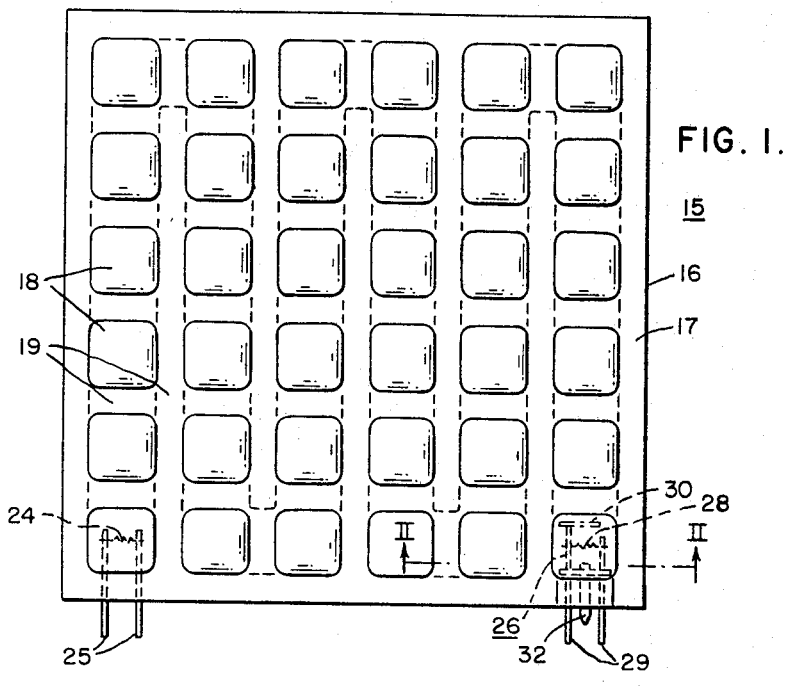
FIGURE 1 is a plan view of the light-emitting face of a panel fluorescent lamp which embodies the present invention.

In FIG. 1 there is shown a representative panel fluorescent lamp 15 consisting of a planar vitreous envelope 16 of rectangular configuration that defines a labyrinthine discharge channel which begins at an electrode 24 located at one corner of the envelope and proceeds in zig-zag fashion through the envelope to a second electrode 28 located at the opposite corner of the envelope. As is shown more clearly in FIG. 2, the envelope 16 consists of a glass faceplate 17 and a glass backplate 20 that are sealed together along their peripheral edges and have their inner surfaces coated with a layer P of phosphor. The faceplate has a series of shallow embossments 18 that are arranged in checkerboard fashion and are separated by flat lands 19 so as to give the faceplate an attractive quilted-pattern appearance.

Figure 2:
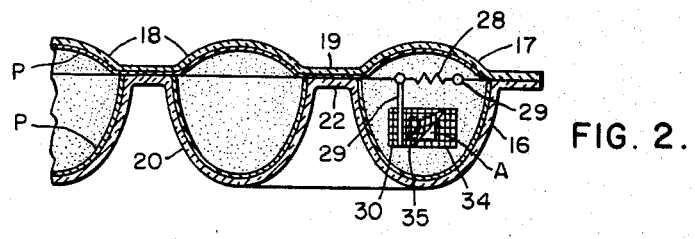
FIG. 2 is an enlarged cross-sectional view through the segment of the lamp that contains one of the electrodes and an amalgam type vapor-pressure regulating component, as viewed along the line II—II of FIG. 1.

The backplate 20, as will be noted in FIG. 2, is deeply channeled and is also provided with flat lands 22 that are aligned with and abut against the lands 19 of the faceplate 17 and thereby define the continuous discharge chamber. The electrode 24 is supported in position within the envelope 16 by a pair of rigid lead-in wires 25 (FIG. 1) that extend through the peripheral seal that joins the envelope components. The other electrode 28 is similarly suppported by a second pair of rigid lead-in wires 29 which extend through the peripheral seal and constitute parts of an integral mount assembly 26 that includes a tipped-off glass tubulation 32.

The electrodes 24 and 28 are of conventional construction and comprise tungsten wire coils that are coated with a suitable electron-emissive material such as the usual mixture of alkaline earth oxides.

The lamp 15 is dosed with a predetermined amount of mercury in excess of that required to sustain the electric discharge, is charged with a suitable ionizable fill gas such as argon or neon at a pressure of from 1 to 3 millimeters, and the inner surfaces of the faceplate 17 and channeled backplate 20 are coated with a suitable ultraviolet-responsive phosphor P in accordance with standard lamp making practice. A more detailed description of a panel fluorescent lamp of this type is given in U.S. Patent No. 3,247,415 issued Apr. 19, 1966 to W. C. Martyny.

Figure 3:
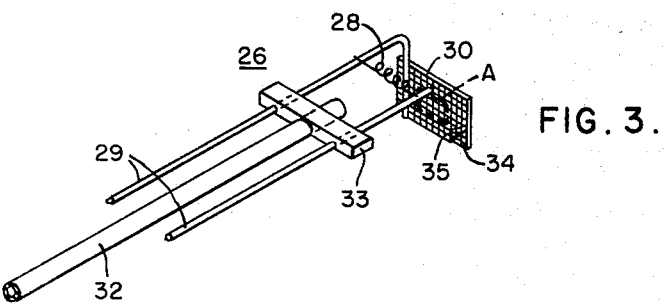
FIG. 3 is a perspective view of the integral electrode mount and amalgam-containing assembly used in the lamp shown in FIGS. 1 and 2.

In accordance with the embodiment of the present invention shown in FIGS. 1 to 3, the operating mercury vapor pressure within the lamp 15 is maintained within a range of about 3 to 14 microns by means of an amalgam-containing component 30 that is attached to and constitutes an integral part of the electrode mount assembly 26. As shown in FIG. 3, the mount assembly 26 consists of the electrode 28, the aforementioned pair of supporting lead-in wires 29 and amalgam-containing component 30 which is attached to a leg formed on the end of one of the lead wires, a vitreous exhaust tube 32, and a bridge 33 of vitreous material that spans and is joined to the lead wires and exhaust tube and holds the various components together to form a unitary structure.

As illustrated in FIGS. 2 and 3, the component 30 comprises a foraminous holder that is formed from two rectangular pieces of wire mesh 34 and 35 and a smaller rectangular piece of amalgam-forming metal A that is sandwiched therebetween and spaced inwardly from the edges of the wire mesh members. The amalgam-forming metal can comprise indium, gold, thallium, tin or alloys thereof in an amount such that when it combines with the mercury dosed into the lamp it forms an alloy or amalgam that is in the two-phase state (that is, partly liquid and partly solid) at the temperatures which prevail within the lamp when it is operated. A suitable indium-mercury amalgam is disclosed in copending application Ser. No. 381,503 filed July 9, 1964 by the present inventor and assigned to the present assignee. A suitable tin-indium-mercury amalgam is disclosed in copending application Ser. No. 678,702 filed Oct. 27, 1967 by Evans and Morehead and assigned to the present assignee.

As will also be noted in FIGS. 2 and 3, the foraminous holder formed by the wire mesh members 34 and 35 is joined, as by spot welding, to the bent leg of the lead-in wire 29 along one of the amalgam-free margins of the holder. Thus, when the mount 26 is sealed within the envelope 16 the component 30 and amalgam-forming metal A are suspended within the discharge channel and are spaced from the faceplate 17. The component 30 is thus located in a plane which is normal to the plane of the envelope 16 and does not cast any shadow on the faceplate 17 or otherwise detract from its uniformly lighted appearance when the lamp is operated.

The amalgam holder 30 can be fabricated from nickel wire mesh, a combination of meshes fabricated from different materials such as copper and nickel-plated copper, or from a non-metallic material such as glass or quartz fibers as disclosed in the aforementioned copending Evans application Ser. No. 381,503 and in copending application Ser. No. 524,898 of Evans filed Feb. 3, 1966. The holder can also be fabricated from a piece of sheet metal, or other rigid material, and the amalgamating metal applied to the holder in the form of a layer.

ALTERNATIVE EMBODIMENTS

Figure 4:
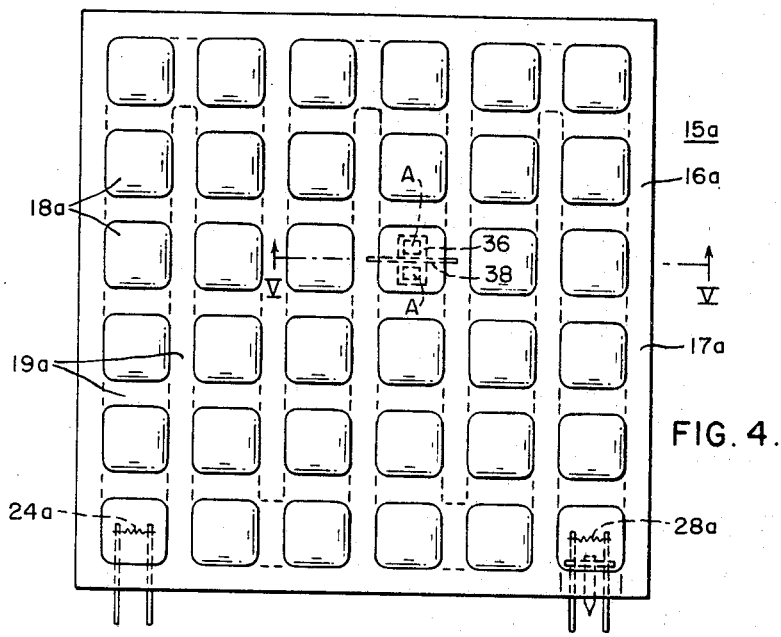
FIG. 4 is a plan view of the light-emitting face of an alternative panel lamp embodiment.
Figure 5:
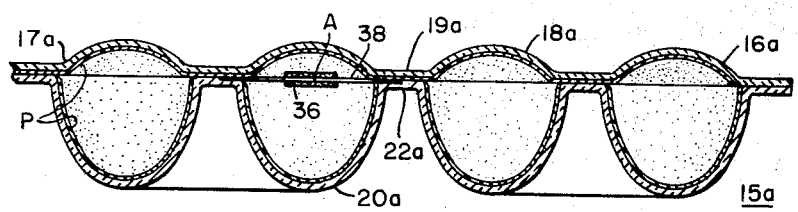
FIG. 5 is an enlarged cross-sectional view of the portion of the lamp that contains the amalgam-containing component, as viewed along the line V—V of FIG. 4.
Figure 6:
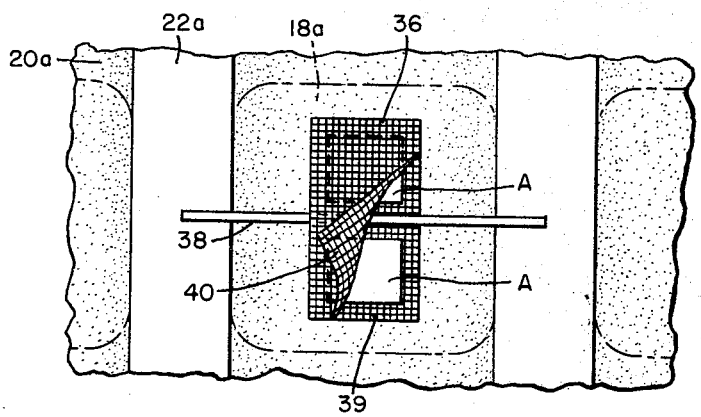
FIG. 6 is an enlarged plan view of the amalgam-containing structure and the associated portion of the backplate of the lamp shown in FIGS. 4 and 5.

In FIGS. 4 to 6 there is shown another lamp embodiment 15a which is of the same construction as the lamp 15 previously described with the exception that two rectangular bodies A of amalgam and the foraminous holder 36 are suspended in the discharge channel at a centrally located position within the envelope 16a by a support wire 38 that is anchored to an interior part of the envelope rather than the lead-in wires.

As shown more particularly in FIGS. 5 and 6, the support member 38 is sandwiched between and anchored in place by the abutting lands 19a and 22a of the faceplate 17a and backplate 20a, respectively, so that the amalgam-containing foraminous holder 36 is suspended within the discharge channel at a location remote from the faceplate. If desired, the arms of the support wire 38 may be bent downwardly (as compared to the position shown in FIG. 5) so that the amalgam bodies A and holder 36 are positioned deeper within the discharge channel and further away from the faceplate 17a. As will be noted in FIG. 6, the segments A of amalgamating metal are spaced inwardly from the edges of the superimposed mesh members 39 and 40 and from each other to insure that the amalgam is retained within the holder and to permit the support member 38 to be inserted through the center of the holder between the amalgam segments A and the mesh members and attached to the latter as by welding. The ends of the support member 38 can be merely clamped between the abutting lands 19a and 22a, or the latter can be heated sufficiently during lamp fabrication to bond the glass to the support and thus securely anchor the pressure-regulating structure in place within the envelope 16a.

Figure 7:
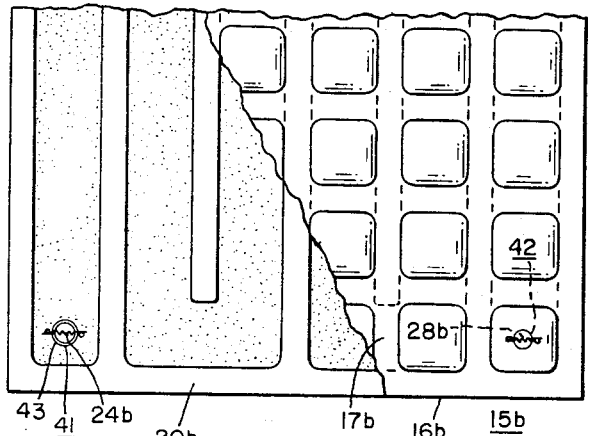
FIG. 7 is a fragmentary view of still another fluorescent panel lamp embodiment having an amalgam-containing structure that is mounted on one of the lamp stems, a portion of the faceplate being removed to illustrate the mount assembly more clearly.
Figure 8:
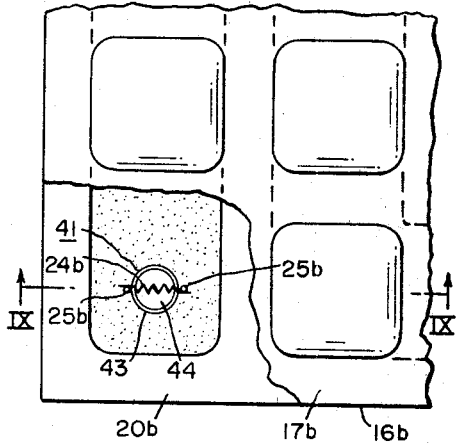
FIG. 8 is an enlarged plan view of the corner segment of the lamp shown in FIG. 7 that contains the integral electrode mount-and-amalgam assembly.
Figure 9:
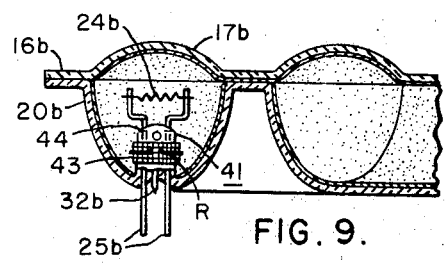
FIG. 9 is a fragmentary cross-sectional view of the lamp segment along the line IX—IX of FIG. 8.

Another embodiment of the invention is shown in FIGS. 7 to 9. The planar lamp 15b is of the same general construction as those previously described. However, the electrodes 24b and 28b are supported at the ends of the discharge channel by mounts 41 and 42 that are sealed into the back of the backplate 20b and the amalgam-containing holder 43 is secured to one of these mounts (mount 41 in the drawings).

As shown more particularly in FIGS. 8 and 9, the amalgam-containing holder 43 consists of a mesh-amalgam sandwich that is of arcuate configuration and shaped in the form of a collar which is attached to the tubular glass stem 44 of the mount 41. The collar 43 is locked in encircling position on the stem 44 by suitable means such as a resilient wire ring R. The amalgam and its mesh holder 43 are thus disposed in the discharge channel at a location which is remote from the faceplate 17b and which will permit the amalgam to control the mercury vapor pressure without producing any shadows on the faceplate when the lamp is energized. The mount 41 includes the usual pair of rigid lead wires 25b and tipped-off exhaust tubulation 32b.

Figure 10:
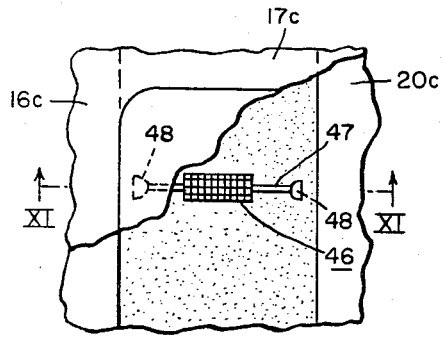
FIGS. 10 and 11 are enlarged plan and cross-sectional views, respectively, of a segment of another panel lamp embodiment that contains another type of amalgam vapor-pressure control structure.
Figure 11:
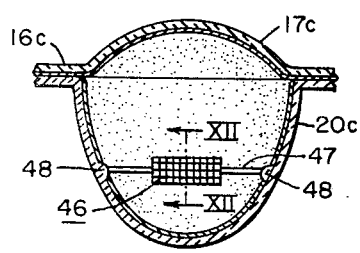

In FIGS. 10 and 11 there is shown another arrangement wherein an amalgam-containing foraminous holder 46 of tubular or cylindrical configuration is suspended within the discharge channel near the bottom of one of the grooves in the backplate 20c by means of a rigid support member 47 such as a wire that spans the channel and is anchored to phosphor-free lugs 48 molded into the inner face of the backplate. The holder 46 and attached support wire 47 are fastened to the backplate 20c after the latter has been coated with phosphor and is ready to be sealed to the faceplate 17c. The wire support 47 is attached to the lugs 48 by solder glass or other suitable means.

Figure 12:
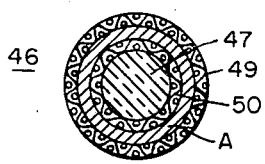
FIG. 12 is an enlarged cross-sectional view of the amalgam-containing component taken along the line XII—XII of FIG. 11.

As shown in FIG. 12, the mercury vapor pressure component 46 according to this embodiment consists of an outer foraminous tubular sleeve 49 and an inner foraminous tubular sleeve 50 of smaller diameter that is fastened to the support wire 47. The amalgamated metal A is sandwiched between the tubular sleeves and partly embedded therein. The sleeves 49, 50 can comprise sections of a fiber glass tube or rope, and the support member 47 can also be composed of fiber glass.

Figure 13:
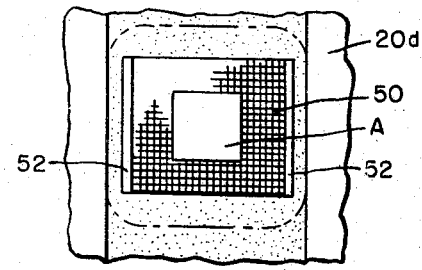
FIGS. 13 and 14 are enlarged planar and cross-sectional views, respectively, of a segment of still another panel lamp embodiment that contains a different type of amalgam vapor-pressure regulating component.
Figure 14:
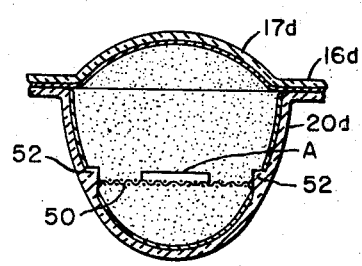

Alternatively, the amalgam can be suspended within the discharge channel by means of a single planar support of rigid foraminous (or solid) material. A structure of this type is shown in FIGS. 13 and 14. As illustrated, a single rectangular strip of rigid wire mesh 50 according to this embodiment is anchored to two longitudinal ribs 52 molded into the inner surface of the backplate 20d at locations such that the mesh strip 50 spans the discharge channel. The amalgam forming material A is simply pressed into the surface of the wire mesh so as to be partly embedded therein and is thus suspended in the discharge channel at a location remote from the faceplate 17d.

It will be apparent from the above-described embodiments that the objects of the invention have been achieved in that a simple and inexpensive means has been provided for controlling the mercury-vapor pressure within a planar fluorescent lamp and increasing its efficiency despite the inherently high operating temperature of such lamps. The amalgam component and associated support structure are mounted and located in the envelope in such a manner that light rays pass unimpeded through the faceplate and provide an area light source of uniform brightness. The amalgam component and support means are also of such construction that they can be readily incorporated as integral parts of the lamp structure during the regular sequence of operations reqired to manufacture the lamps on a mass production basis.

While several embodiments have been illustrated and described, it will be understood that various changes in the construction and arrangement of the holder, support means, etc. can be made without departing from the spirit and scope of the invention.

I claim as my invention:

1. A planar fluorescent lamp comprising:
   a vitreous envelope having a pair of extended spaced walls that define a labyrinthine discharge channel,
   an ultraviolet-responsive phosphor on the inner surface of said envelope,
   a pair of spaced electrodes supported within said envelope at the respective ends of said discharge channel so that the latter extends from one of said electrodes to the other electrode,
   one of said electrodes being held in such position by a pair of rigid lead-in conductors that are sealed through a wall of said envelope,
   an amalgam within said envelope comprising a metal and a predetermined quantity of mercury in excess of the amount required to sustain an electric discharge between said electrodes when the lamp is energized, and
   a rigid holder that is attached to one of said lead-in conductors and is of such configuration that it is suspended within the discharge channel solely by said lead-in conductor,
   said holder comprising a pair of foraminous members that are disposed in overlying sandwiched relationship with said amalgam and retain the latter at a location within the discharge channel such that the amalgam maintains the mercury vapor pressure within a range of from about 3 to 14 microns during the operation of the lamp without interfering with the passage of light through the light-emitting face of said envelope.

2. A planar fluorescent lamp comprising:
   a vitreous envelope comprising a channeled backplate and a faceplate that are hermetically sealed together along their peripheries and define a labyrinthine discharge channel,
   an ultraviolet-responsive phosphor on the inner surface of said envelope,
   a pair of spaced electrodes supported within said envelope at the respective ends of said discharge channel so that the latter extends from one of said electrodes to the other electrode,
   an amalgam within said envelope comprising a metal and a predetermined quantity of mercury in excess of the amount required to sustain an electric discharge between said electrodes when the lamp is energized, and
   means retaining said amalgam at a predetermined location within the lamp comprising a rigid holder that is fastened to said envelope,
   said holder being of such configuration and so oriented with respect to said backplate that the amalgam is suspended in the discharge channel at a location remote from both of said electrodes such that the amalgam maintains the mercury vapor pressure within a range of from about 3 to 14 microns during the operation of the lamp without interfering with the passage of light through said faceplate.

3. The planar fluorescent lamp set forth in claim 2 wherein:
   said faceplate and backplate have intermediate portions that constitute lands which are aligned with one another and disposed in abutting relationship, and
   said amalgam and holder are suspended in the discharge channel by a support member that is disposed between and anchored in place by the abutting lands of said facepate and backplate.

4. The planar fluorescent lamp set forth in claim 2 wherein:
   said holder is foraminous and of tubular configuration and said amalgam is located within said tubular holder, and
   said tubular holder is fastened to a support member that is attached to said backplate and spans the portion of the discharge channel defined thereby so that said holder and amalgam are suspended in the discharge channel.

5. The planar fluorescent lamp set forth in claim 2 wherein said holder is of planar configuration and fastened to said backplate at a location such that the holder spans the discharge channel.

References Cited

UNITED STATES PATENTS

| | | | |
|---|---|---|---|
| 3,047,763 | 7/1962 | Inman | 313—109 |
| 3,422,209 | 1/1969 | Morehead | 313—180 X |
| 2,077,961 | 4/1937 | Smith | 313—179 |
| 2,280,618 | 4/1942 | Besson | 313—225 X |
| 2,404,803 | 7/1946 | Stafford | 206—0.4 X |
| 3,007,071 | 10/1961 | Lompe et al. | 313—178 |
| 3,152,278 | 10/1964 | Dziergwa et al. | 313—109 X |
| 3,187,885 | 6/1965 | Hansen et al. | |
| 3,243,630 | 3/1966 | Martyny | 313—109 |
| 3,287,587 | 11/1966 | Menelly | 313—178 X |

ROBERT SEGAL, Primary Examiner

D. O'REILLY, Assistant Examiner

U.S. Cl. X.R.

206—0.4; 313—174, 178